United States Patent [19]

Niwa et al.

[11] Patent Number: 4,507,476
[45] Date of Patent: Mar. 26, 1985

[54] ANTHRAQUINONE DYESTUFFS FOR CELLULOSE-CONTAINING FIBERS

[75] Inventors: Toshio Niwa; Kiyoshi Himeno; Toshio Hihara, all of Yokohama, Japan

[73] Assignee: Mitsubishi Chemical Industries Limited, Tokyo, Japan

[21] Appl. No.: 568,340

[22] Filed: Jan. 5, 1984

[30] Foreign Application Priority Data

Feb. 4, 1983 [JP] Japan .................................. 58-17206

[51] Int. Cl.³ .................. C07D 251/42; C07D 251/48
[52] U.S. Cl. ...................................... 544/187; 544/189
[58] Field of Search .................................. 544/187, 189

[56] References Cited

U.S. PATENT DOCUMENTS

3,974,160 8/1976 Seiler et al. ........................... 544/187
4,436,906 3/1984 Niwa et al. ............................ 544/187

Primary Examiner—John M. Ford
Attorney, Agent, or Firm—Oblon, Fisher, Spivak, McClelland & Maier

[57] ABSTRACT

This invention relates to an anthraquinone dyestuff for cellulose containing fibers represented by the formula:

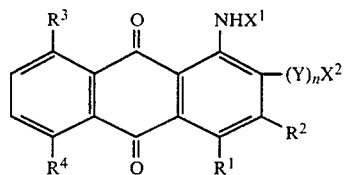

wherein $R^1$ represents amino or hydroxyl, $R^2$ represents hydrogen, chlorine, bromine, cyano or $-SO_2R$ wherein R represents methyl, ethyl or phenyl, $R^3$ and $R^4$ each represents hydrogen, amino, hydroxyl, nitro, chlorine or bromine, Y represents a connecting group consisting of $-O-$ or $-S-$, one of $X^1$ and $X^2$ is hydrogen and the other is a group of the formula:

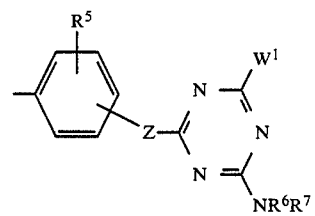

wherein $-Z-$ represents a connecting group consisting of $-O-$ or $-S-$, $-W^1$ represents phenyl or $-NR^6R^7$, $R^5$ represents hydrogen, methyl, ethyl, methoxy, ethoxy, chlorine or bromine, $R^6$ and $R^7$ each represents hydrogen or alkyl, alkenyl, cyclohexyl, aryl or aralkyl which may optionally be substituted by lower alkoxy, or $NR^6R^7$ represents a 5-membered or 6-membered nitrogen-containing heterocyclic ring formed by combination of $R^6$ and $R^7$, and n is 0 or 1, with the proviso that where $X^2$ is hydrogen, n is 0.

12 Claims, No Drawings

ANTHRAQUINONE DYESTUFFS FOR CELLULOSE-CONTAINING FIBERS

BACKGROUND OF THE INVENTION

1. Field of the Invention

This invention relates to anthraquinone dyestuffs for cellulose-containing fibers. More specifically, it relates to anthraquinone dyestuffs which dye cellulose-containing fibers, especially cellulose fibers and mixed fibers comprising polyester fibers and cellulose fibers, in bluish red to blue colors having excellent fastness properties.

2. Description of the Prior Art

A method for dyeing or print dyeing cellulose fibers or mixed fibers containing these fibers using a dyestuff of the following formula [II] and free from sulfonic acid or carboxylic acid groups:

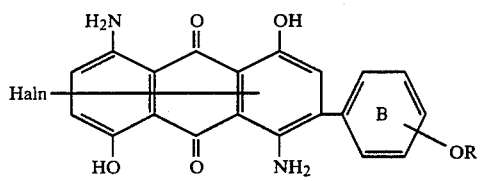

wherein R represents hydrogen or optionally substituted alkyl, aryl or acyl, Hal represents chlorine or bromine, n represents a numeral of 1-2, and the ring B may optionally be further substituted or may optionally be condensed, with the proviso that where R represents hydrogen or methyl, n must be >0 and/or B must further be substituted is known (Japanese Patent Application Laid-open No. 57078/1980), and the present inventors have been intensively studying for further improvement, to discover that the dyestuffs of the formula [I] described herein can provide dyed products superior in wet fastness, wash fastness, etc. as compared with the dyestuffs of the above formula [II], thereby having accomplished this invention.

SUMMARY OF THE INVENTION

An object of this invention is provide anthraquinone dyestuffs for cellulose-containing fibers which are of the formula [I]:

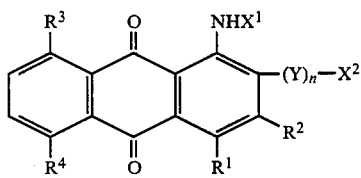

wherein $R^1$ represents amino or hydroxyl, $R^2$ represents hydrogen, chlorine, bromine, cyano or —SO$_2$R wherein R represents methyl, ethyl or phenyl, $R^3$ and $R^4$ each represents hydrogen, amino, hydroxyl, nitro, chlorine or bromine, Y represents a connecting group consisting of —O— or —S—, one of $X^1$ and $X^2$ is hydrogen and the other is a group of the formula:

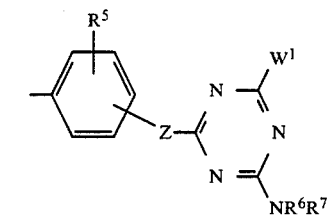

wherein —Z— represents a connecting group consisting of —O— or —S—, —W$^1$ represents phenyl or —NR$^6$R$^7$, R$^5$ represents hydrogen, methyl, ethyl, methoxy, ethoxy, chlorine or bromine, R$^6$ and R$^7$ each represents hydrogen or alkyl, alkenyl, cyclohexyl, aryl or aralkyl which may optionally be substituted by lower alkoxy, or NR$^6$R$^7$ represents a 5-membered or 6-membered nitrogen-containing heterocyclic ring formed by combination of R$^6$ and R$^7$, and n is 0 or 1, with the proviso that where $X^2$ is hydrogen, n is 0.

DETAILED DESCRIPTION OF THE PREFERRED EMBODIMENTS

The dyestuffs of the formula [I] above may be readily produced by reacting anthraquinone compounds of the formula [III]:

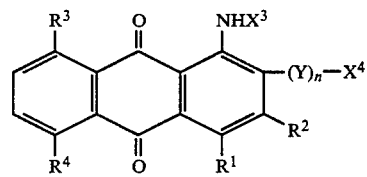

wherein $R^1$, $R^2$, $R^3$, $R^4$, Y and n are as defined above, one of $X^3$ and $X^4$ is hydrogen, and the other is

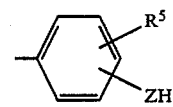

wherein $R^5$ is as defined above, and —ZH represents hydroxyl or mercapto, with the proviso that where $X^4$ is hydrogen, n is 0, with triazine compounds of the formula [IV]:

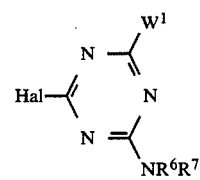

wherein Hal represents active halogen, and W$^1$, R$^6$ and R$^7$ are as defined above.

In the formulae [I] and [IV], examples of alkyl represented by R$^6$ and R$^7$ include methyl, ethyl and straight-chain or branched-chain alkyl of 3–8 carbon atoms, and examples of alkyl substituted by lower alkoxy include 2-ethoxyethyl, 3-isopropoxypropyl, 3-(2-methoxyethoxy)propyl and 2,2-diethoxyethyl.

Examples of alkenyl include allyl, 2-methylallyl, 3-methylallyl and straight-chain or branched-chain alkenyl of 4–8 carbon atoms, and examples of substituted alkenyl include 2-methoxyallyl and 3-methoxyethoxyallyl.

Examples of aryl include phenyl, o-tolyl, p-ethylphenyl etc., and examples of aryl substituted by lower alkoxy include p-methoxyphenyl, 2,5-dimethoxyphenyl, m-ethoxyphenyl etc.

Examples of aralkyl include benzyl, phenethyl, m-methylbenzyl etc., and examples of substituted aralkyl include p-methoxybenzyl, m-ethoxybenzyl etc.

Examples of the nitrogen containing heterocyclic group represented by $NR^6R^7$ include 1-pyrrolidinyl, 3-methyl-1-pyrrolidinyl, 2-hydroxyethyl-1-pyrrolidinyl, 2,5-dimethyl-1-pyrrolidinyl, 3-thiazolidinyl, 1-pyrrolyl, 1-pyrazolyl, 1-imidazolyl, morpholino, piperidino, 2,6-dimethylpiperidino, 1-piperadinyl, 4-methyl-1-piperadinyl etc.

Amino of 3–10 carbon atoms in total is particularly preferred as $NR^6R^7$.

For producing an anthraquinone dyestuff of the formula [I], an anthraquinone compound of the formula [III] and 1–1.2 molar times of said anthraquinone compound of a monohalogenotriazine of the formula [IV] may be heated at 50°–130° C. in an organic solvent such as acetone, methyl ethyl ketone, toluene, nitrobenzene, dioxane, N,N-dimethylformamide, N-methyl-2-pyrrolidone, dimethylsulfoxide etc. in the presence of 1–2 molar times of said anthraquinone compound of an acid binding agent, for example, a tertiary amine such as triethylamine, tributylamine, N,N-diethylaniline etc. or an inorganic base such as potassium carbonate, potassium bicarbonate etc. for about 0.5–5 hours. The resulting reaction mixture is cooled and then the formed precipitates are separated by filtration, thereby an anthraquinone dyestuff of the formula [I] may be obtained.

Examples of the cellulose-containing fibers which are dyed with the dyestuffs according to this invention include natural fibers such as cotton, linen etc.; semi-synthetic fibers such as viscose rayon, copper ammonia rayon etc., and modified cellulose fibers which are partially aminated or partially acylated. Of course, they may be woven or knitted fabrics or non-woven fabrics. Further, mixed yarns or mixed woven fabrics of the above-described fibers and other fibers such as polyester fibers, cation-dyeable polyester fibers, anion-dyeable polyester fibers, urethane fibers, di- or triacetate fibers etc. may also be dyed. Of those, the cellulose fibers and the mixed yarns or mixed woven fabrics of cellulose fibers and polyester fibers are particularly effectively dyed with the dyestuffs of this invention.

As the method of dyeing the above-described cellulose-containing fibers with the dyestuffs of this invention, a pad dyeing and print dyeing are particularly preferred.

In dyeing, the dyestuff of the formula [I] above is preferably dispersed in a medium in a particle size of about 0.5 to 2μ. Examples of the dispersing method include a method which comprises finely dispersing the dyestuff in water by a grinder such as a sand grinder, a mill etc. using a water-soluble dispersing agent such as a nonionic or anionic dispersing agent, e.g. sodium ligninsulfonate or a sodium salt of a naphthalenesulfonic acid—formaldehyde condensate, a method which comprises finely dispersing the dyestuff in a solvent other than water, for example, alcohols such as ethyl alcohol, isopropyl alcohol, polyethylene glycol etc., ketones such as acetone, methyl ethyl ketone etc., hydrocarbons such as n-hexane, toluene, xylene, mineral terpene etc., halogenated hydrocarbons such as tetrachloroethylene etc., esters such as ethyl acetate, butyl acetate etc., ethers such as dioxane, tetraethyleneglycol dimethyl ether etc., and mixed solvents thereof, using a dispersing agent sparingly soluble or insoluble in water such as a sulfosuccinic acid ester, or an addition product of nonylphenol etc. with a low mole of ethylene oxide etc., a method which comprises finely dispersing the dyestuff in a mixed system of water and a solvent freely compatible with water chosen from the above-described solvents, etc.

Further, during the course of this dispersing, a polymer compound soluble in the respective dispersing media or a surface active agent having a main function other than the dispersing action may also be added.

This fine dispersion of the dyestuff can be used as such as a padding bath in pad dyeing or as a printing paste in print dyeing. In general, however, a diluted dispersion obtained by diluting the fine dispersion of the dyestuff to a concentration depending on the desired dyeing concentration with water, a mixed system of a solvent freely compatible with water and water or an O/W or W/O emulsion in which the oily layer is a petroleum hydrocarbon such as mineral terpene etc. or a halogenated hydrocarbon such as tetrachloroethylene etc. is employed as a padding bath or as a printing paste.

In order to practice this invention advantageously in the preparation of a padding bath or a printing paste, a cellulose fiber-swelling agent is added. Further, for the purpose of preventing dry migration in pad dyeing or for the purpose of controlling the viscosity of each color paste to an optimum value for various print dyeing methods, a thickener, for example, water-soluble polymer compounds such as sodium alginate etc. may also be added.

The cellulose fiber-swelling agent is not always required to be present in the padding bath or in the printing color paste, and it may alternatively be present in the fiber beforehand.

Any compound may be used as the cellulose fiber-swelling agent so long as it has a boiling point of 150° C. or higher and has an effect to swell cellulose fibers, and examples thereof include ureas such as N,N,N',N'-tetramethylurea etc., and polyhydric alcohols such as polyethylene glycol, polypropylene glycol etc. or derivatives thereof. In particular, polyhydric alcohols having an average molecular weight of about 200–500 such as polyethylene glycol, polypropylene glycol etc. or derivatives thereof are preferred as the cellulose fiber-swelling agent. The amount of the cellulose fiber-swelling agent used is suitable about 5–25% by weight, preferably about 8–15% by weight, based on the padding bath or the printing color paste.

Dyeing of the above-described fibers with the dyestuffs of this invention may be conducted in the conventional manner, for example, by impregnating or printing the thus prepared padding bath or printing color paste with or to cellulose fiber containing materials, drying the materials, heat-treating the materials with hot air at 160°–220° C. or with superheated steam for 30 seconds to 10 minutes, alternatively, treating the materials in a high pressure saturated steam at 120° to 150° C. for 3 to 30 minutes, and then washing with hot water water containing a surface active agent.

By the process described above, dyed products which have been clearly and uniformly dyed and have good light fastness and wet color fastness may be obtained.

This invention will be described below in more detail by reference to the examples but is not deemed to be limited thereto so long as this invention is not beyond the gist thereof.

EXAMPLE 1

A dyestuff dispersion was prepared from a dyestuff composition consisting of 15 g of an anthraquinone dyestuff of the structural formula:

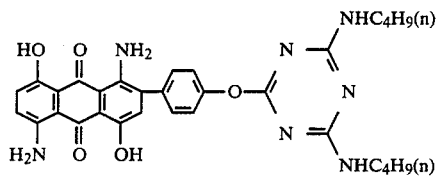

15 g of a naphthalenesulfonic acid—formaldehyde condensate and 70 ml of water using a paint shaker as a finely dispersing machine.

Using this dyestuff dispersion, a printing color paste having the following composition:

| | |
|---|---|
| Dyestuff dispersion | 6.5 g |
| 5% Sodium alginate aqueous solution | 55 g |
| Polyethylene glycol dimethyl ether (average molecular weight: 400) | 9 g |
| Water | balance |
| Total | 100 g | was prepared. As polyester/cotton (mixing ratio: 65/35) mixed spun cloth was print dyed with the printing color paste using a screen print dyeing machine, provisionally dried at 80° C. for 3 minutes, and then dry heated at 215° C. for 90 seconds to fix the paste. This was washed with water, and then soaped with a detergent solution containing 2 g/l of a nonionic surface active agent ("Scourol #900", trademark, manufactured by Kao Soap Co., Ltd.) in a bath ratio of 1:30 for 20 minutes to obtain a blue dyed product having excellent wash fastness and light fastness.

The dyestuff used in this example was prepared as follows: 3.62 g of 1,5-diamino-4,8-dihydroxy-2-(4'-hydroxyphenyl)-anthraquinone was dissolved in 50 ml of N-methyl-2-pyrrolidone, 2.0 g of triethylamine, 1.4 g of potassium carbonate and 2.8 g of 2-chloro-4,6-di-n-butylaminotriazine were added thereto and stirred at 100° C. for 3 hours to effect condensation. The resulting reaction mixture was added dropwise to 500 ml of water, the formed precipitates were filtered out, washed with water, and dried to obtain 5.5 g of a dark blue powder of the dyestuff of the above structural formula. The λmax (acetone) of this dyestuff was 628 nm.

COMPARATIVE EXAMPLE 1

A blue dyed product was obtained by procedures similar to those described in Example 1 above but using a dyestuff described in Example 1 of Japanese Patent Application Laid-open No. 57078/1980 and of the structural formula:

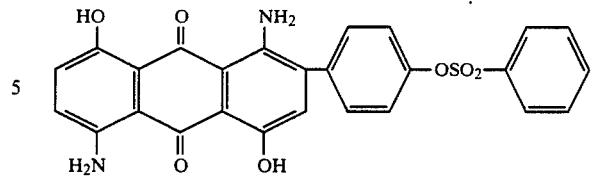

When the dyed products obtained in Example 1 (Invention) and Comparative Example 1 (Comparison) were tested according to Japan Industrial Standard L 0860 (Dry Cleaning Fastness Test) and L 0844 Method A-4 (Wash Fastness Test), the dyed product dyed with the dyestuff of this invention clearly exhibited superior fastness.

COMPARATIVE EXAMPLE 2

A blue dyed product was obtained by procedures similar to those described in Example 1 above but using a dyestuff described in Example 2 of Japanese Patent Application Laid-open No. 57078/1980 and of the structural formula:

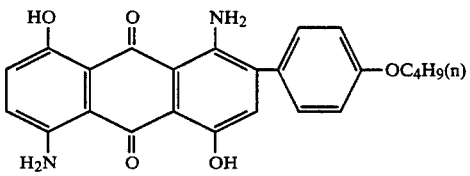

When the dyed products obtained in Example 1 (Invention) and Comparative Example 2 (Comparison) were tested according to Japan Industrial Standard L 0860 (Dry Cleaning Fastness Test) and L 0844 Method A-4 (Wash Fastness Test), the dyed product dyed with the dyestuff of this invention clearly exhibited superior fastness.

EXAMPLE 2

A dyestuff dispersion was prepared from a dyestuff composition consisting of 15 g of an anthraquinone dyestuff of the structural formula:

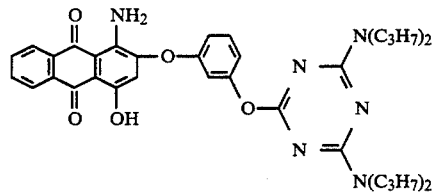

15 g of a naphthalenesulfonic acid—formaldehyde condensate and 70 ml of water using a sand grinder as a finely dispersing machine.

Using this dyestuff dispersion, a printing color paste having the following composition:

| | |
|---|---|
| Dyestuff dispersion | 7 g |
| 5% Sodium alginate aqueous solution | 55 g |
| Polypropylene glycol (average molecular weight: 300) | 12 g |
| Water | balance |
| Total | 100 g | was prepared. A mercerized cotton broad (40 counts) was print dyed with the printing color paste using a screen print dyeing machine, then provisionally dried at 80° C. for 3 minutes, and treated with superheated steam at 190° C. for 7 minutes.

Thereafter, washing treatment was performed according to the procedures described in Example 1 to obtain a blurish red dyed product having excellent light fastness and wet color fastness.

The dyestuff used in this example was produced according to the procedures described in Example 1.

The λmax (acetone) of this dyestuff was 518 nm.

EXAMPLE 3

A dyestuff dispersion was prepared from a dyestuff composition consisting of 16 g of an anthraquinone dyestuff of the structural formula:

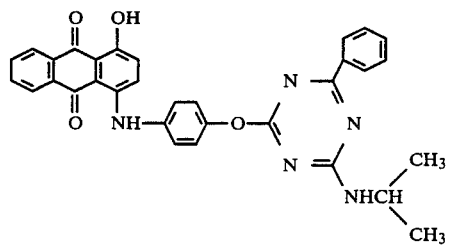

10 g of polyoxyethylene glycol nonylphenol ether (HLB 13.3) and 74 g of water by finely dispersing using a sand grinder.

Using this dyestuff dispersion, a padding bath having the following composition:

| | |
|---|---|
| Dyestuff dispersion | 6 g |
| Tetraethylene glycol dimethyl ether | 15 g |
| Water | balance |
| Total | 100 g | was prepared, a polyester/cotton (mixing ratio: 65/35) mixed spun cloth was impregnated therewith, then squeezed to a squeezing rate of 45%, dried at 100° C. for 2 minutes and dry heated at 200° C. for 1 minute to fix. This was then washed according to the procedures described in Example 1 to obtain a purple dyed product having excellent wet color fastness. The dyestuff used in this example was produced according to the procedures described in Example 1.

The λmax (acetone) of this dyestuff was 559 nm.

EXAMPLE 4

Print dyeing was conducted according to the procedures described in Example 1 by using anthraquinone dyestuffs set forth in the following Tables 1, 2, 3 and 4. The hue of each dyed product obtained and the λmax (acetone) of each anthraquinone dyestuff used are shown in Tables 1, 2, 3 and 4.

TABLE 1

Structural Formula

| No. | $-R^3$ | $-R^4$ | $-Y-$ | $-W$ | $-NR^6R^7$ | Hue of Dyed Product | λ max (acetone) (nm) |
|---|---|---|---|---|---|---|---|
| 1 | —H | —H | —O— | —NHC$_3$H$_6$OC$_3$H$_7$(i) | —NHC$_3$H$_6$OC$_3$H$_7$(i) | Bluish red | 518 |
| 2 | " | " | " | —N⟨H O⟩ (morpholino) | —N⟨H O⟩ (morpholino) | " | " |
| 3 | " | " | " | —NHC$_3$H$_7$(n) | —N(CH$_2$—CH=CH$_2$)$_2$ | " | " |
| 4 | " | " | " | —phenyl | —N(CH$_3$)(C$_2$H$_5$) | " | " |
| 5 | " | " | " | —N⟨H⟩ (piperidino) | —N[C$_3$H$_7$(n)]$_2$ | " | " |
| 6 | " | —Br | " | —NH—phenyl | —N[C$_4$H$_9$(n)]$_2$ | Rubine | 530 |
| 7 | " | —H | —S— | —NH—⟨H⟩ (cyclohexyl) | —NHC$_5$H$_{11}$(i) | Reddish purple | 543 |

TABLE 2

Structural Formula

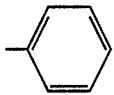

| No. | —R² | —Y— | —W | —NR⁶R⁷ | Hue of Dyed Product | λ max (acetone) (nm) |
|---|---|---|---|---|---|---|
| 1 | —Cl | —O— | phenyl | —NH-(2,5-dimethoxyphenyl) | Blue | 611 |
| 2 | —Br | " | —NH-cyclohexyl | —N($C_2H_5$)($C_2H_4OCH_3$) | " | 612 |
| 3 | " | " | piperazinyl-N—$CH_3$ | —N(H)($C_3H_6OC_2H_4OCH_3$) | " | 609 |
| 4 | —CN | " | —NHC₂H₄-(3-methoxyphenyl) | —NHC₆H₁₃(n) | Greenish blue | 634 |
| 5 | —SO₂CH₃ | " | phenyl | —NH(CH₂—CH=CH₂) | " | 622 |
| 6 | —CONHC₂H₅ | —S— | —N[C₃H₇(i)]₂ | —[C₃H₇(i)]₂ | " | 614 |

TABLE 3

Structural Formula

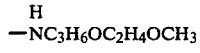

| No. | —R⁵ | —W | —NR⁶R⁷ | Hue of Dyed Product | λ max (acetone) (nm) |
|---|---|---|---|---|---|
| 1 | —H | —NHC₆H₁₃(n) | —NHC₆H₁₃(n) | Blue | 630 |
| 2 | " | —NHC₅H₁₁(n) | piperazinyl-N—C₂H₅ | " | " |
| 3 | " | pyrrolyl | pyrrolyl | " | " |

TABLE 3-continued

Structural Formula (anthraquinone with HO, NH$_2$, H$_2$N, OH substituents, linked via phenyl-O to triazine with W and NR$^6$R$^7$, R$^5$ on phenyl)

| No. | —R$^5$ | —W | —NR$^6$R$^7$ | Hue of Dyed Product | λ max (acetone) (nm) |
|---|---|---|---|---|---|
| 4 | —OCH$_3$ | —NH—C$_6$H$_{11}$ (cyclohexyl) | —NH—C$_6$H$_{11}$ (cyclohexyl) | " | 629 |
| 5 | —CH$_3$ | phenyl | —NHC$_3$H$_7$(i) | " | 633 |
| 6 | —Cl | 2,5-dimethylpyrrolidin-1-yl | 2,5-dimethylpyrrolidin-1-yl | " | 635 |

TABLE 4

Structural Formula (anthraquinone with two NH$_2$ groups, Y-linker to phenyl-O-triazine with W and NR$^6$R$^7$, R$^2$ substituent)

| No. | —R$^2$ | —Y— | —W | —NR$^6$R$^7$ | Hue of Dyed Product | λ max (acetone) (nm) |
|---|---|---|---|---|---|---|
| 1 | —H | —O— | —N(H)(CH$_2$—C(CH$_3$)=CH$_2$) | —N(H)(CH$_2$—C(CH$_3$)=CH$_2$) | Reddish Purple | 546 |
| 2 | " | " | —NH—phenyl | —N(CH$_3$)$_2$ | Reddish Purple | " |
| 3 | —Cl | " | —NHC$_6$H$_{13}$(n) | —NHC$_6$H$_{13}$(n) | Purple | 554 |
| 4 | " | " | —NHC$_2$H$_4$—phenyl | —NHC$_2$H$_5$ | " | " |
| 5 | " | " | —NH—phenyl | —NH—phenyl | " | " |
| 6 | —Br | " | —N(morpholino) | —N(morpholino) | " | 553 |
| 7 | —H | —S— | —NHC$_8$H$_{17}$(n) | —NH$_2$ | " | 551 |

EXAMPLE 5

Pad dyeing was conducted according to the procedures described in Example 3 by using anthraquinone dyestuffs set forth in the following Tables 5, 6 and 7. The hue of each dyed product obtained and the λmax (acetone) of each anthraquinone dyestuff used are shown in Tables 5, 6 and 7.

TABLE 5

Structural Formula

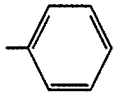

| No. | $-R^3$ | $-R^4$ | $-Y-$ | $-W$ | $-NR^6R^7$ | Hue of Dyed Product | λ max (acetone) (nm) |
|---|---|---|---|---|---|---|---|
| 1 | $-H$ | $-H$ | $-O-$ | $-NHC_2H_4OC_2H_5$ | $-NHC_2H_4OC_2H_5$ | Bluish red | 518 |
| 2 | " | " | " | —⟨phenyl⟩ | $-NHC_4H_9(t)$ | " | " |
| 3 | " | " | " | $-N(CH_3)$—⟨phenyl⟩ | $-NH_2$ | " | " |
| 4 | " | " | " | piperazine-$N-CH_3$ | piperazine-$N-CH_3$ | " | " |
| 5 | " | " | $-S-$ | $-NHCH_2$—⟨m-tolyl⟩ | $H$ $-NC_3H_7(n)$ | Reddish purple | 542 |
| 6 | " | " | $-O-$ | $-N(C_4H_9(sec))_2$ | $-N(C_4H_9(sec))_2$ | Bluish red | 518 |
| 7 | " | $-Cl$ | " | $-NHC_2H_4$—⟨C$_6$H$_4$⟩—$OCH_3$ | $-NHC_5H_{11}$ | Rubine | 530 |

TABLE 6

Structural Formula

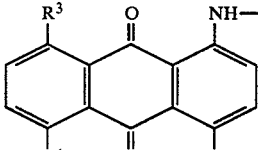

| No. | $-R^3$ | $-R^4$ | $-Y-$ | $-W$ | $-NR^6R^7$ | Hue of Dyed Product | λ max (acetone) (nm) |
|---|---|---|---|---|---|---|---|
| 1 | $-H$ | $-H$ | $-O-$ | $-NH$—⟨cyclohexyl⟩ | $-NH$—⟨cyclohexyl⟩ | Purple | 559 |
| 2 | " | " | " | $-NH$—⟨phenyl⟩ | $-NH$—⟨phenyl⟩ | " | " |

TABLE 6-continued

Structural Formula:

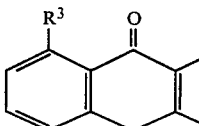

| No. | —R³ | —R⁴ | —Y | —W | —NR⁶R⁷ | Hue of Dyed Product | λ max (acetone) (nm) |
|---|---|---|---|---|---|---|---|
| 3 | " | " | " | 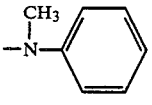 | -N(CH₂CH₂)₂O (morpholino) | " | " |
| 4 | " | " | " | 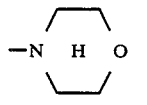 -N(CH₃)(C₆H₅) | 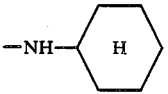 -N(CH₃)(C₆H₅) | " | " |
| 5 | " | " | —S— | —N(C₂H₄OC₂H₅)₂ | —N(C₂H₄OC₂H₅)₂ | " | 554 |
| 6 | —NO₂ | —OH | —O— | —N(C₄H₉(n))₂ | —N(C₄H₉(n))₂ | Blue | 582 |
| 7 | " | " | " | —NH—C₆H₁₁ (cyclohexyl) | —NH₂ | " | " |
| 8 | " | " | " | —NH—C₆H₅ | —NHC₂H₅ | " | " |
| 9 | " | " | —S— | —NHC₂H₄—C₆H₅ | —NHC₃H₇(i) | " | 584 |
| 10 | " | " | " | 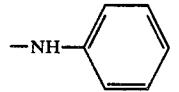 | —NC₄H₉(sec) with H | " | " |
| 11 | —OH | —NO₂ | —O— | —NHC₅H₁₁(n) | —NHC₅H₁₁(n) | " | 586 |
| 12 | " | " | " | —N(C₂H₄OC₂H₄OCH₃)₂ | —N(C₂H₄OC₂H₄OCH₃)₂ | " | " |
| 13 | " | " | " | 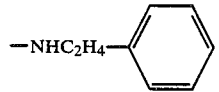 | 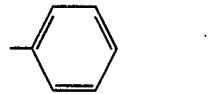 | " | " |
| 14 | —NH₂ | —OH | " | -N(CH₂CH₂)₂O (morpholino) | —NHC₈H₁₇(n) | " | 610 |
| 15 | " | " | " |  —NH—C₆H₄—OCH₃ | 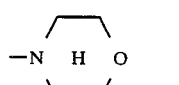 —NH—C₆H₄—OCH₃ | " | " |
| 16 | " | " | " | 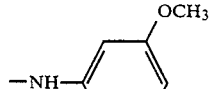 —NH—C₆H₅ | —NHC₅H₁₁(n) | " | " |
| 17 | —OH | —NH₂ | " | —NC₅H₁₁(n) with H | —NHC₅H₁₁(n) | " | 612 |

TABLE 6-continued

Structural Formula:

| No. | −R³ | −R⁴ | −Y | −W | −NR⁶R⁷ | Hue of Dyed Product | λ max (acetone) (nm) |
|---|---|---|---|---|---|---|---|
| 18 | " | " | " | | −NHC₄H₉(n) | " | " |
| | | | | 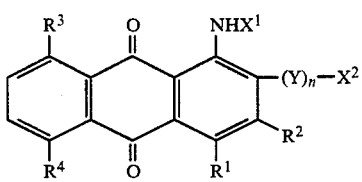 | | | |
| 19 | " | " | −S− | −NHC₃H₇(i) | −NHC₃H₇(i) | " | 613 |

TABLE 7

Structural Formula:

| No. | −R⁵ | −W | −NR⁶R⁷ | Hue of Dyed Product | λ max (acetone) (nm) |
|---|---|---|---|---|---|
| 1 | −CH₃ | | −N(CH₃)₂ | Blue | 629 |
| 2 | " | 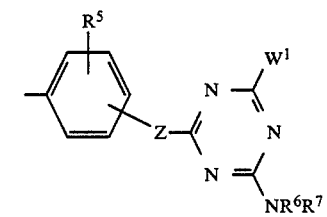 | | " | " |
| 3 | −OC₂H₅ | −NHC₈H₁₇(n) | −NHC₈H₁₇(n) | " | 630 |
| 4 | " | −NHC₂H₄OC₂H₄OCH₃ | −NHC₂H₄OC₂H₄OCH₃ | " | " |

What is claimed is:

1. An anthraquinone dyestuff for cellulose-containing fibers which is of the formula:

wherein $R^1$ represents amino or hydroxyl, $R^2$ represents hydrogen, chlorine, bromine, cyano or —SO₂R wherein R represents methyl, ethyl or phenyl, $R^3$ and $R^4$ each represents hydrogen, amino, hydroxyl, nitro, chlorine or bromine, Y represents a connecting group consisting of —O— or —S—, one of $X^1$ and $X^2$ is hydrogen and the other is a group of the formula:

wherein —Z— represents a connecting group consisting of —O— or —S—, —$W^1$ represents phenyl or —NR⁶R⁷, $R^5$ represents hydrogen, methyl, ethyl, methoxy, ethoxy, chlorine or bromine, $R^6$ and $R^7$ each represents hydrogen or alkyl, alkenyl, cyclohexyl, aryl or aralkyl which may optionally be substituted by lower alkoxy, or NR⁶R⁷ represents a 5-membered or 6-membered nitrogen-containing heterocyclic ring formed by combination of $R^6$ and $R^7$, and n is 0 or 1, with the proviso that where $X^2$ is hydrogen, n is 0.

2. The anthraquinone dyestuff for cellulose-containing fibers according to claim 1 which is of the formula:

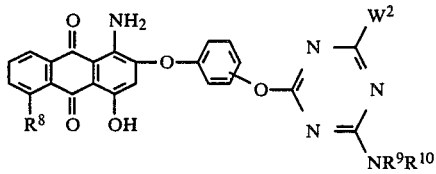

wherein $R^8$ represents hydrogen, chlorine or bromine, $W^2$ represents phenyl or $NR^9R^{10}$, and $R^9$ and $R^{10}$ each represents hydrogen or alkyl or aryl which may optionally be substituted by lower alkoxy, or $NR^9R^{10}$ represents a 5-membered or 6-membered nitrogen-containing heterocyclic ring formed by combination of $R^9$ and $R^{10}$.

3. The anthraquinone dyestuff for cellulose-containing fibers according to claim 1 which is of the formula:

wherein $R^{11}$ represents chlorine, bromine, cyano, methylsulfonyl or ethylsulfonyl, $W^3$ represents phenyl or $NR^{12}R^{13}$, and $R^{12}$ and $R^{13}$ each represents hydrogen or alkyl or aryl which may optionally be substituted by lower alkoxy, or $NR^{12}R^{13}$ represents a 5-membered or 6-membered nitrogen-containing heterocyclic ring formed by combination of $R^{12}$ and $R^{13}$.

4. The anthraquinone dyestuff for cellulose-containing fibers according to claim 1 which is of the formula:

wherein $R^{14}$ and $R^{15}$ each represents hydroxyl, amino or nitro, $W^4$ represents phenyl or $NR^{16}R^{17}$, and $R^{16}$ and $R^{17}$ each represents hydrogen or alkyl or aryl which may optionally be substituted by lower alkoxy, or $NR^{16}R^{17}$ represents a 5-membered or 6-membered nitrogen-containing heterocyclic ring formed by combination of $R^{16}$ and $R^{17}$.

5. The anthraquinone dyestuff for cellulose-containing fibers according to claim 1 which is of the formula:

wherein $R^{18}$ represents chlorine or bromine, $W^5$ represents phenyl or $NR^{19}R^{20}$, and $R^{19}$ and $R^{20}$ each represents hydrogen, or alkyl or aryl which may optionally be substituted by lower alkoxy, or $NR^{19}R^{20}$ represents a 5-membered or 6-membered nitrogen-containing heterocyclic ring formed by combination of $R^{19}$ and $R^{20}$.

6. The anthraquinone dyestuff for cellulose-containing fibers according to claim 1 which is of the formula:

wherein $W^6$ represents phenyl or $NR^{21}R^{22}$, and $R^{21}$ and $R^{22}$ each represents hydrogen or alkyl or aryl which may optionally be substituted by lower alkoxy, or $NR^{21}R^{22}$ represents a 5-membered or 6-membered nitrogen-containing heterocyclic ring formed by combination of $R^{21}$ and $R^{22}$.

7. The anthraquinone dyestuff for cellulose-containing fibers according to claim 1 which is of the formula:

8. The anthraquinone dyestuff for cellulose-containing fibers according to claim 1 which is of the formula:

9. The anthraquinone dyestuff for cellulose-containing fibers according to claim 1 which is of the formula:

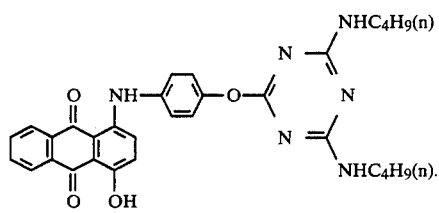
10. The anthraquinone dyestuff for cellulose-containing fibers according to claim 1 which is of the formula:
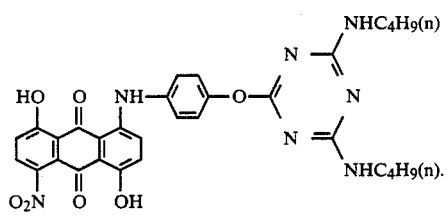
11. The anthraquinone dyestuff for cellulose-containing fibers according to claim 1 which is of the formula:
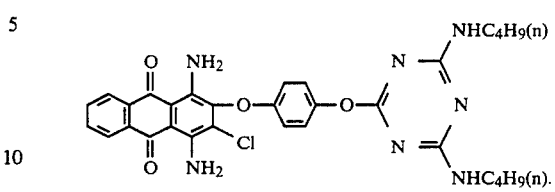
12. The anthraquinone dyestuff for cellulose-containing fibers according to claim 1 which is of the formula:
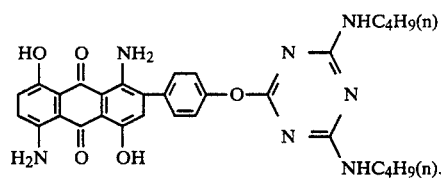
* * * * *